United States Patent
Dubeuf et al.

(10) Patent No.: US 11,171,780 B2
(45) Date of Patent: *Nov. 9, 2021

(54) SYSTEMS AND METHODS FOR OPERATING SECURE ELLIPTIC CURVE CRYPTOSYSTEMS

(71) Applicant: Maxim Integrated Products, Inc., San Jose, CA (US)

(72) Inventors: Jeremy Dubeuf, La Ciotat (FR); Frank Lhermet, Roquevaire (FR); Yann Yves Rene Loisel, La Ciotat (FR)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,566

(22) Filed: May 6, 2020

(65) Prior Publication Data

US 2020/0266986 A1 Aug. 20, 2020

Related U.S. Application Data

(63) Continuation of application No. 15/683,448, filed on Aug. 22, 2017, now Pat. No. 10,680,819.

(30) Foreign Application Priority Data

Aug. 23, 2016 (FR) ...................................... 1657853

(51) Int. Cl.
*H04L 9/30* (2006.01)
*H04L 9/00* (2006.01)
(Continued)

(52) U.S. Cl.
CPC .......... *H04L 9/3066* (2013.01); *G06F 7/4824* (2013.01); *G06F 7/725* (2013.01);
(Continued)

(58) Field of Classification Search
CPC ........... H04L 9/3066; H04L 9/002–005; G06F 7/4824; G06F 7/725; G06F 21/75–755;
(Continued)

(56) References Cited

U.S. PATENT DOCUMENTS 8,804,952 B2 * 8/2014 Al-Somani ............. H04L 9/003
380/28
9,772,821 B2 * 9/2017 Feix ....................... H04L 9/3236
(Continued)

OTHER PUBLICATIONS

Hedabou, Mustapha, Pierre Pinel, and Lucien Bénéteau. "A comb method to render ECC resistant against Side Channel Attacks." IACR Cryptol. ePrint Arch. 2004 (2004): 342. (Year: 2004).*
(Continued)

*Primary Examiner* — Madhuri R Herzog
(74) *Attorney, Agent, or Firm* — North Weber & Baugh LLP; Michael North

(57) ABSTRACT

Various embodiments of the invention implement countermeasures designed to withstand attacks by potential intruders who seek partial or full retrieval of elliptic curve secrets by using Various embodiments of the invention implement countermeasures designed to withstand attacks by potential intruders who seek partial or full retrieval of elliptic curve secrets by using known methods that exploit system vulnerabilities, including elliptic operation differentiation, dummy operation detection, lattice attacks, and first real operation detection. Various embodiments of the invention provide resistance against side-channel attacks, such as simple power analysis, caused by the detectability of scalar values from information leaked during regular operation flow that would otherwise compromise system security. In certain embodiments, system immunity is maintained by performing elliptic scalar operations that use secret-independent operation flow in a secure Elliptic Curve Cryptosystem.

20 Claims, 11 Drawing Sheets

(51) Int. Cl.
 *G06F 7/48* (2006.01)
 *G06F 7/72* (2006.01)
(52) U.S. Cl.
 CPC .............. *H04L 9/003* (2013.01); *H04L 9/004* (2013.01); *H04L 9/005* (2013.01); *G06F 2207/7219* (2013.01); *G06F 2207/7223* (2013.01); *G06F 2207/7261* (2013.01)
(58) Field of Classification Search
 CPC ..... G06F 2207/7219; G06F 2207/7223; G06F 2207/7261
 See application file for complete search history.

(56) References Cited

U.S. PATENT DOCUMENTS

| | | | | |
|---|---|---|---|---|
| 2007/0177721 | A1* | 8/2007 | Itoh | H04L 9/3066 380/28 |
| 2007/0198824 | A1* | 8/2007 | Chen | H04L 9/3066 713/150 |

OTHER PUBLICATIONS

E. A. El-Badawy, A. M. Emarah and A. E. T. El-Deen, "Proposed Elliptic Curve for Counter-Measuring both Sign Change Fault Attacks and Side Channel Attacks," Proceedings of the Twenty Third National Radio Science Conference (NRSC'2006), Menoufiya, 2006, pp. 1-7, doi: 10.1109/NRSC.2006.386355. (Year: 2006).*

Fan, Junfeng, et al. "State-of-the-art of secure ECC implementations: a survey on known side-channel attacks and countermeasures." 2010 IEEE International Symposium on Hardware-Oriented Security and Trust (HOST). IEEE, 2010. (Year: 2010).*

\* cited by examiner

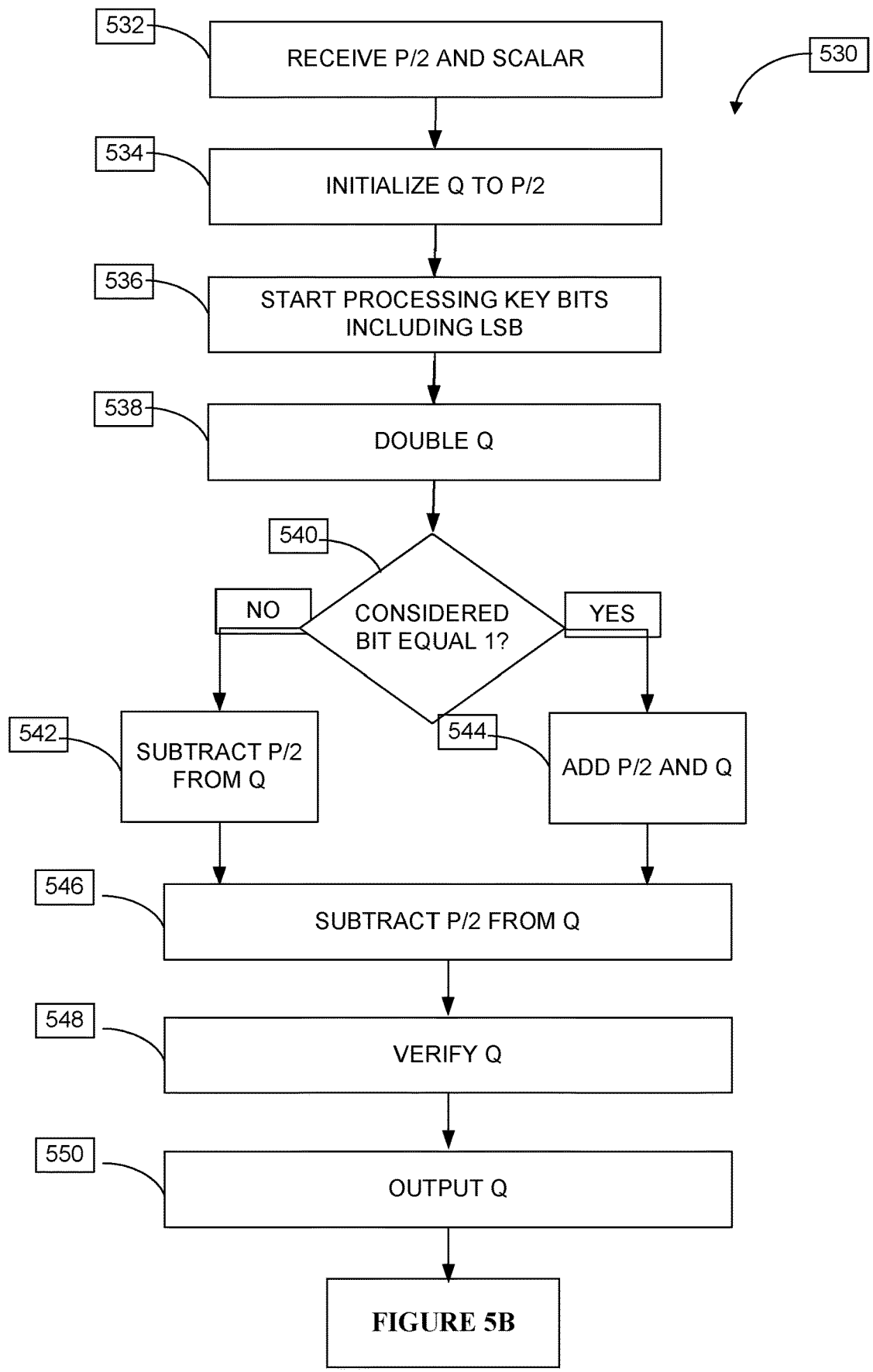

SYSTEMS AND METHODS FOR OPERATING SECURE ELLIPTIC CURVE CRYPTOSYSTEMS

CROSS-REFERENCED TO RELATED APPLICATIONS

This patent application is related to and claims priority benefit, under 35 U.S.C. § 120, to co-pending and commonly-assigned U.S. patent application Ser. No. 15/683,448, entitled "Systems and Methods for Operating Secure Elliptic Curve Cryptosystems," naming as inventors, Jeremy Dubeuf, Frank Lhermet, and Yann Yves Rene Loisel, filed Aug. 22, 2017, which claims priority to previously filed and commonly owned French Patent Application No. 1657853, entitled, "Systems and Methods for Operating Secure Elliptic Curve Cryptosystems," naming as inventors, Jeremy Dubeuf, Frank Lhermet, and Yann Yves Rene Loisel, filed Aug. 23, 2016, which patent documents are incorporated by reference herein in its entirety and for all purposes.

BACKGROUND

A. Technical Field

The present invention relates to secure systems and, more particularly, to secure systems and methods for Elliptic Curve Cryptosystems (ECCs) designed as countermeasure to side-channel attacks aimed at uncovering secret information from operations performed by electric circuitry.

B. Background of the Invention

Elliptic Curve Cryptosystem (ECC) implementations are increasingly replacing RSA for use in asymmetric cryptographic schemes, such as Diffie-Hellman key exchange or authentication, due to the exponential increase in key length requirements for RSA that makes improvements in security relatively difficult compared to ECCs, for which improvements in security require only a linear increase in key length. As an example, the security level of a 128-bit symmetric system, for which RSA requires a key length of 3,072 bits, can be converted into a 256-bit symmetric system by increasing the RSA key length five-fold to 15,360 bits. In comparison, the key length required to improve an equivalent 128-bit ECC symmetric system into a 256-bit symmetric system increases linearly, i.e., two-fold, from 256-283 bits to 512-571 bits. As a result, upgrading the security level of an RSA product drastically decreases system performance in terms of time, power consumption, and cost when compared to an ECC secured circuit.

Like other cryptosystems, ECCs use standard, non-proprietary algorithms to encrypt confidential data to protect against theft of secret information. Most encryption methods, however, do not prevent determined adversaries from circumventing the cryptosystem and unveiling critical keying material as data is being processed by the encryption circuit during encryption and decryption of confidential data. Well-known weaknesses in cryptosystems include leakage of information in the form of timing, power consumption, and electro-magnetic radiation information detectable during computations and subject to analysis even without physical tampering. Additionally, information may leak when the cryptosystem is subjected to fault insertion.

Side-channel attacks are one type of attack frequently employed to extract encryption keys, passwords, and other cryptographic data from a secure system (e.g., payment terminals, smart cards, security modules, mobile phones) by taking advantage of the fact that circuit properties are closely associated with and reflect the physical implementation of the encryption engine and the operations performed on the data processed by the particular encryption algorithm. In a differential side-channel attack, for example, a skilled attacker may perform numerous calls to a function in the secure system that the attacker attempts to break by performing statistical analysis on characteristic circuit properties, including electromagnetic emissions profiles of current and voltage transitions, power consumption profiles, and timing patters of generated signals. Since different instructions have different power consumption profiles, after monitoring a circuit under investigation, collecting sufficient data, and filtering out noise by statistical means, details of the system behavior can be inferred from the obtained information and, ultimately, the sought after secret data can be reconstructed.

For example, the implementation of a standard algorithm into a secure system causes current to flow through a given logic circuit from which knowledge about the circuit and the data processed by logic circuitry is inadvertently revealed to the surroundings of the circuit. In a circuit with a fixed number of gates and fixed location the data and current associated with that data travel through logic gates, which makes logic operations within the circuit prone to being probed for the purpose of tracing and extracting secret information, thereby, rendering the security of the cryptosystem vulnerable.

Several approaches exist aimed at protecting the security of a circuit by increasing the level of difficulty of carrying out this type of non-intrusive attack and prevent the leakage of observable, compromising information from a circuit to its surroundings. One such approach relies on modifying the encryption algorithm in such a manner as to perform security-related operations on both the actual bits of a secret key as well as the inverse thereof.

Other types of attack on a circuit include the method of fault injection. Using this approach, in preparation of carrying out an attack, an adversary manipulates a circuit that normally undergoes random operations and forces the circuit to deviate from regular cryptographic operations to switch into a more deterministic mode of operation. For example, by purposefully raising a voltage applied to the circuit, the attacker may trigger a certain circuit response that, in effect, reduces the randomness of operations, thereby, allowing the attacker to gain control of a more predictable circuit behavior and making it easier to successfully carry out an attack.

What is needed are tools for secure systems designers to overcome the above-described limitations while taking advantage of the benefits ECC provides to secured circuits.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIG. 5B and FIG. 5C illustrate exemplary flowcharts for processes that provide resistance to simple power analysis and c-safe-errors by evaluating the LSB within a loop, according to various embodiments of the invention.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document, the terms "infinity point," "initial value set to infinity," and "point at infinity" are used interchangeably.

Figure 1:
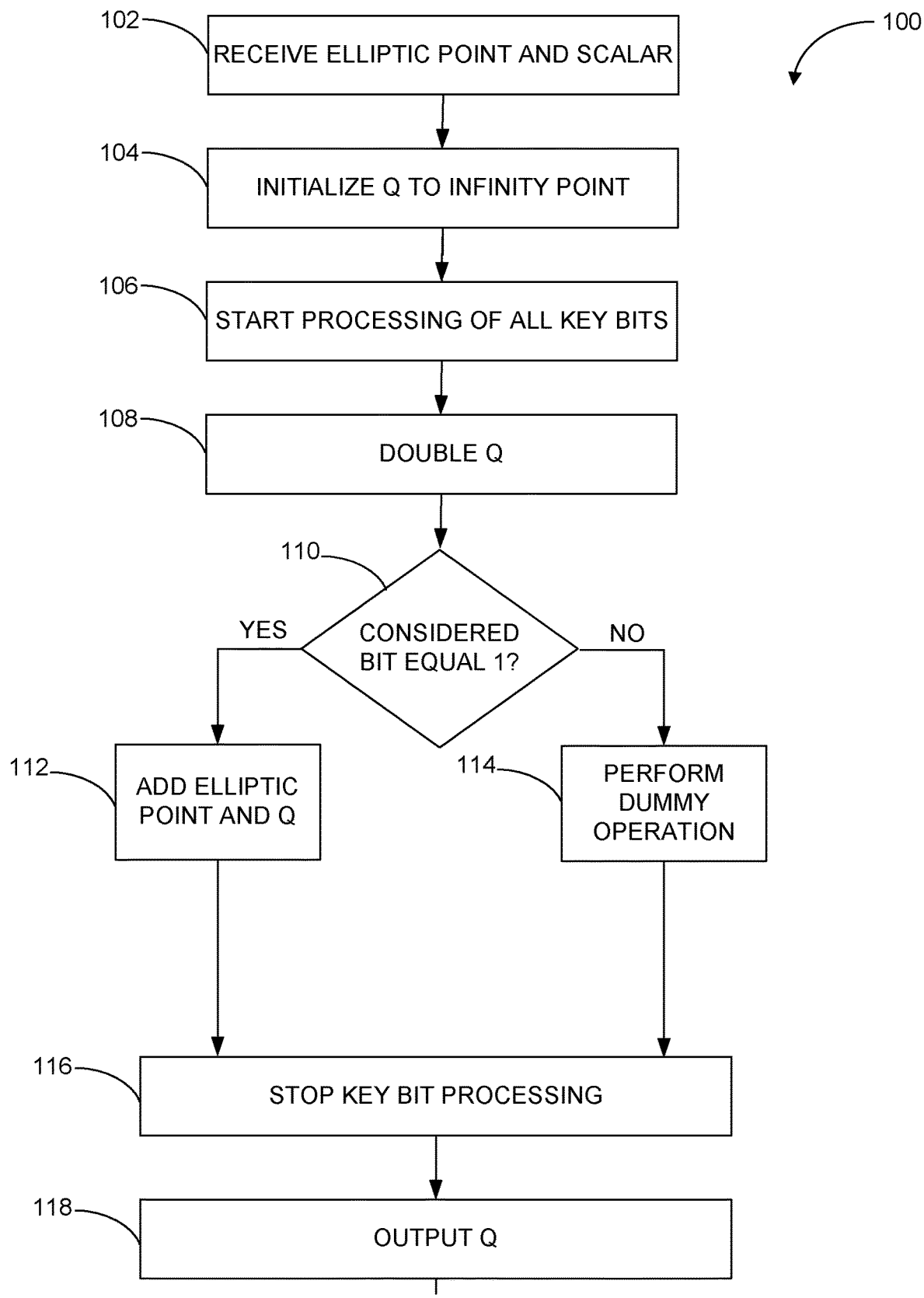
FIG. 1 is a flowchart that illustrates a process using an existing ECC using a scalar double-and-add algorithm that includes dummy operations as countermeasure to simple power analysis.

FIG. 1 is a flowchart that illustrates a process using an existing ECC using a scalar double-and-add algorithm that includes dummy operations as countermeasure to simple power analysis. In general, an elliptic curve is a set of points that is defined by an equation. Basic operations on points of the elliptic curve, such as a scalar multiplication or addition can be used to encrypt data. While multiplication, addition, and doubling operations are analogous to those applied to numbers, two points located on an elliptic curve are added within their own system of coordinates. Adding two points on a curve will result in a third point located on the curve, and the addition process is iterative. A point is multiplied by a scalar typically by adding the point a certain number of times to itself to yield another point on the curve based on a formula, such that the multiplication by a scalar equals an addition.

If the point of origin and the number of times an addition is to be performed are known, the result is easy to compute. In contrast, if only the resulting point is known, it is virtually impossible to determine the number of times the addition had been performed to arrive at the resulting point. It is this effect that makes point multiplication attractive for use in cryptography.

The method shown in FIG. 1, also known as "always-double-and-add," is typically implemented as a scalar algorithm in the ECC. Process 100 begins at step 102 when an elliptic point and a scalar are received by the ECC for processing.

At step 104, Q is initialized to the infinity point (i.e., a neutral element for elliptic curves) before at step 106 key bits of the scalar are sequentially processed.

The processing of the secret bits includes always doubling Q at step 108, and, if the parsed value of the processed bit is equal to 1, then performing an elliptical point addition by adding, at step 112, the elliptic point to Q.

Conversely, if the considered bit does not equal 1 then, at step 114, performing a dummy operation, typically without saving the result or saving it at a different location.

The dummy operation inserted by this technique forces an elliptic addition to be executed in this step even if the result of that addition is not actually constituting a countermeasure to an SPA attack.

After all secret key bits are processed at step 116, at step 118, Q is output.

There exist a number of scalar algorithms that can perform similar operations. For example, a scalar may be used to yield a digital signature, and a result can be verified by using a public key value. Advantageously, since the public key value cannot be used to retrieve the private value, this presents a difficult to solve problem, thus, lending itself to public key cryptography for digital signatures. However, like most other methods, this approach presents significant weaknesses in the scalar algorithm in terms of security since these type of operations are easily observable giving rise to information leaks that can be detected through side-channel analysis, including timing analysis, SPA, or EM equivalence leading to the discovery of the secret length, which can be exploited, e.g., through lattices.

As an example, in a practical implementation the Q register is initialized at the infinity point (i.e., at zero), i.e., until a nonzero bit is being processed, no real doubling and no real calculation operation is performed because a multiplication by zero still leads to a zero result. Then, when the first nonzero bit is, in fact, being processed only a data transfer takes place, but no calculation is performed. As a result, the first elliptic point addition operation that is preceded by an elliptic point double operation (i.e., the infinity point) can be detected as a relatively shorter and different timing pattern or amplitude pattern. It is noted that since once the processed secret bit equals 1 an elliptic addition is performed, but no operation is performed when the value of the secret bit equals 0 and the result remains unchanged.

Figure 2:
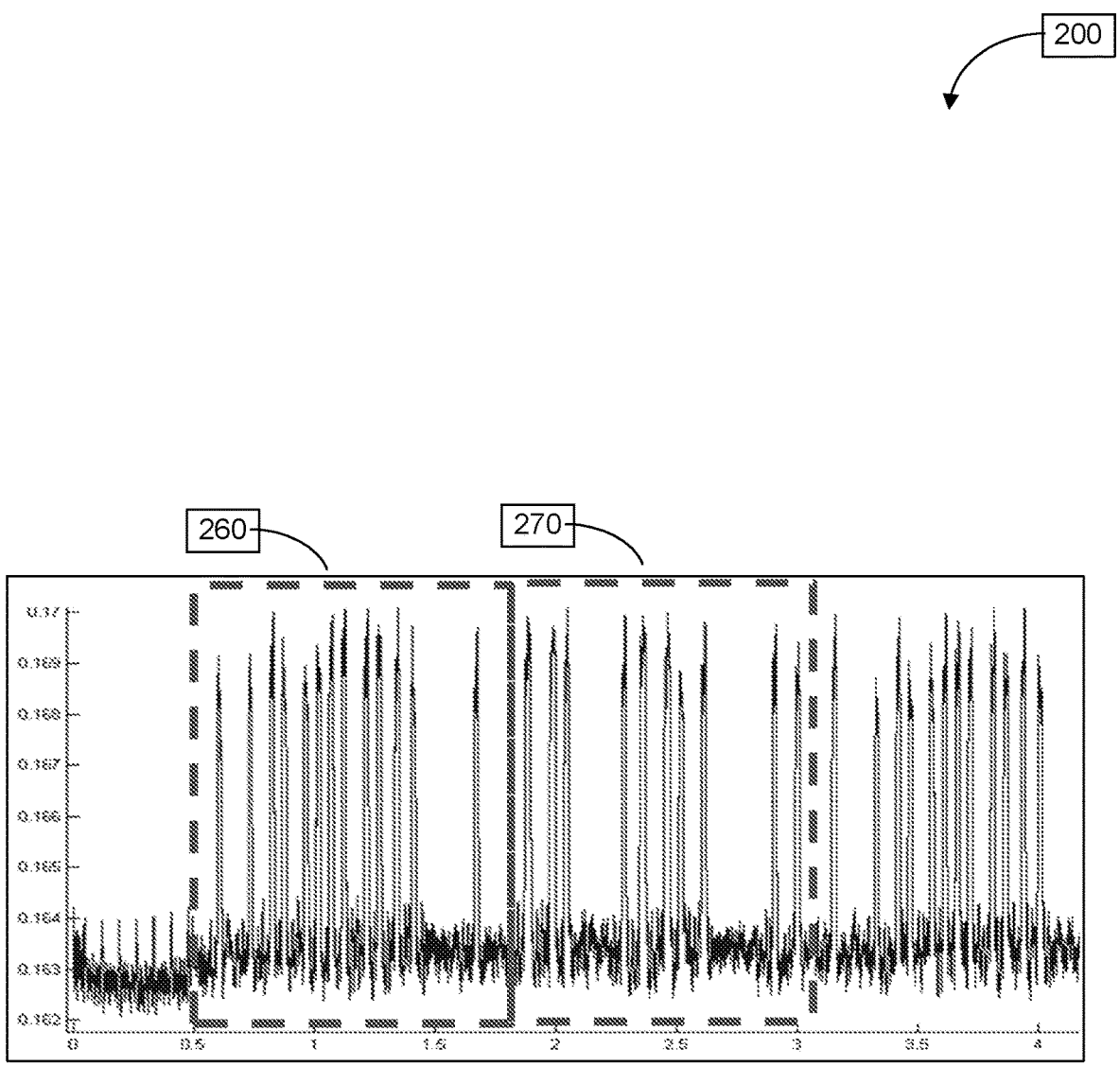
FIG. 2 shows a typical power trace for an exemplary double-and-add sequence of operations.

In addition, absent step 114, a skilled attacker may differentiate the elliptic addition from the elliptic doubling operation, for example, by using power analysis or EM equivalent in order to exploit the relatively shorter and different timing patterns, lower amplitudes, etc., created by the two different operations in order to partially or fully retrieve the elliptic curve secret. FIG. 2 shows a typical power trace 200 for an exemplary double-and-add sequence of operations. Power trace 200 illustrates differences in the power consumption patterns for an elliptic point double operation 260 and an elliptic point addition operation 270. By observing the characteristic patterns for a given sequence of secret keys processed by elliptic double-an-add operations, the attacker can relatively easily find the secret key.

Figure 3A:
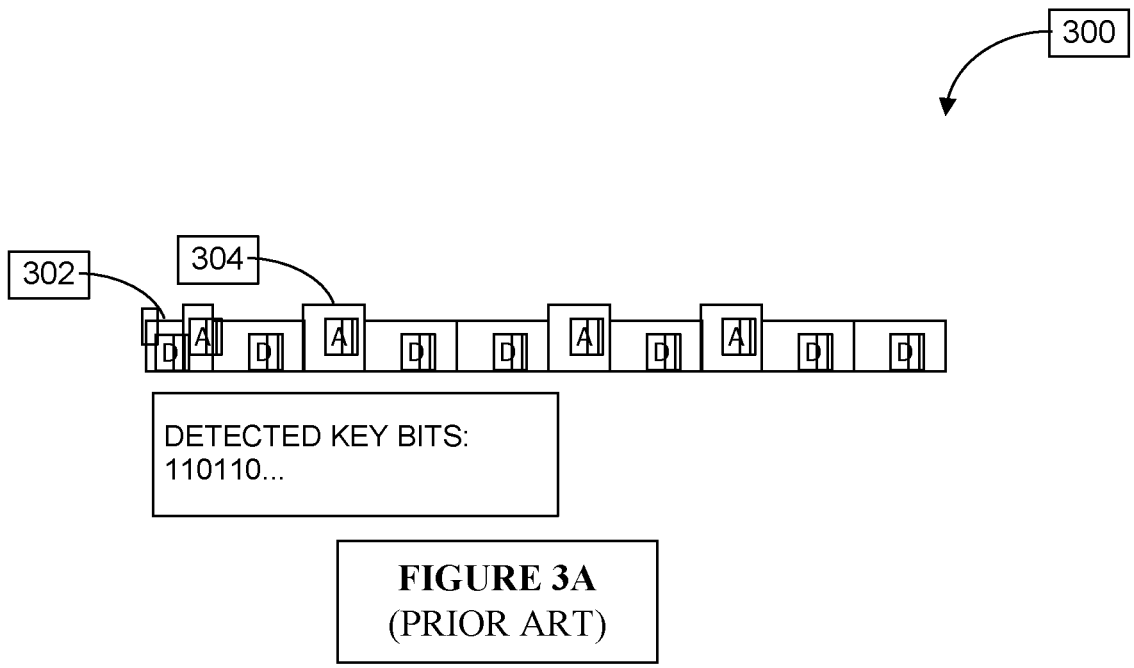
FIGS. 3A and 3B illustrate the detection of secret key bits from exemplary sequences of elliptic double-and-add operations without countermeasure.
Figure 3B:
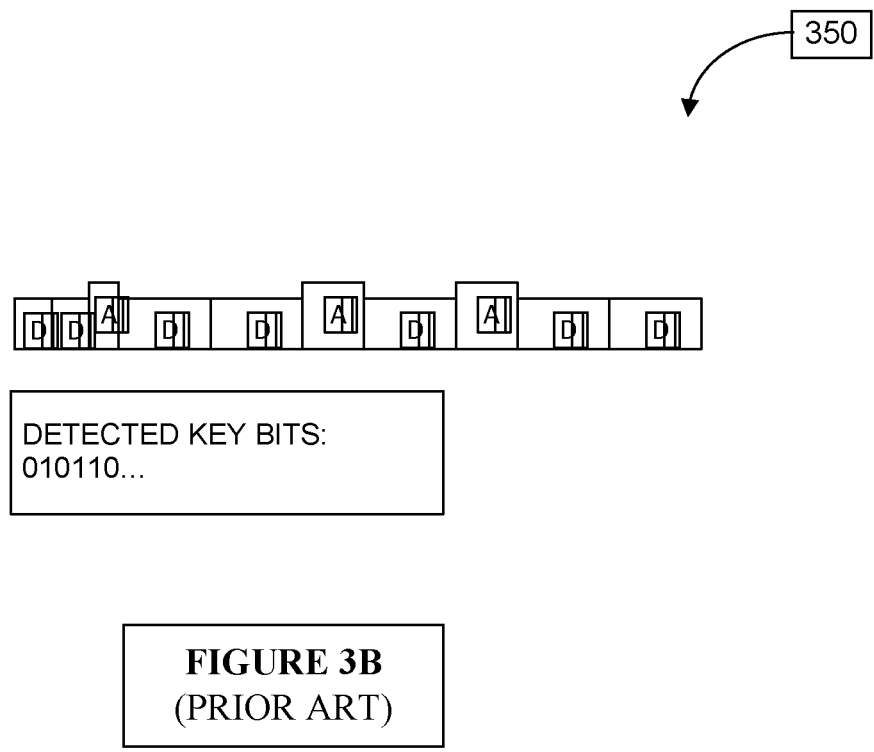

FIGS. 3A and 3B illustrate the detection of secret key bits from exemplary sequences of elliptic double-and-add operations without countermeasure. In sequences 300 and 350, the letter "D" 302 indicates an elliptic point doubling, whereas the letter "A" 304 indicates an elliptic point addition. Since additions are performed only when the secret key bit is equal to 1, the detection of a pattern for two consecutive D's 304, i.e., elliptic double operations, indicates a zero bit, whereas a D 304 followed by an A 302 indicates a 1 for the secret bit. As a result, the key bit sequence 110110 can be obtained from sequence 300. Similarly, the pattern for secret sequence 350 leaks information that allows the attacker to deduce and expose the key bit sequence 010110, thereby, compromising system security.

Figure 4A:
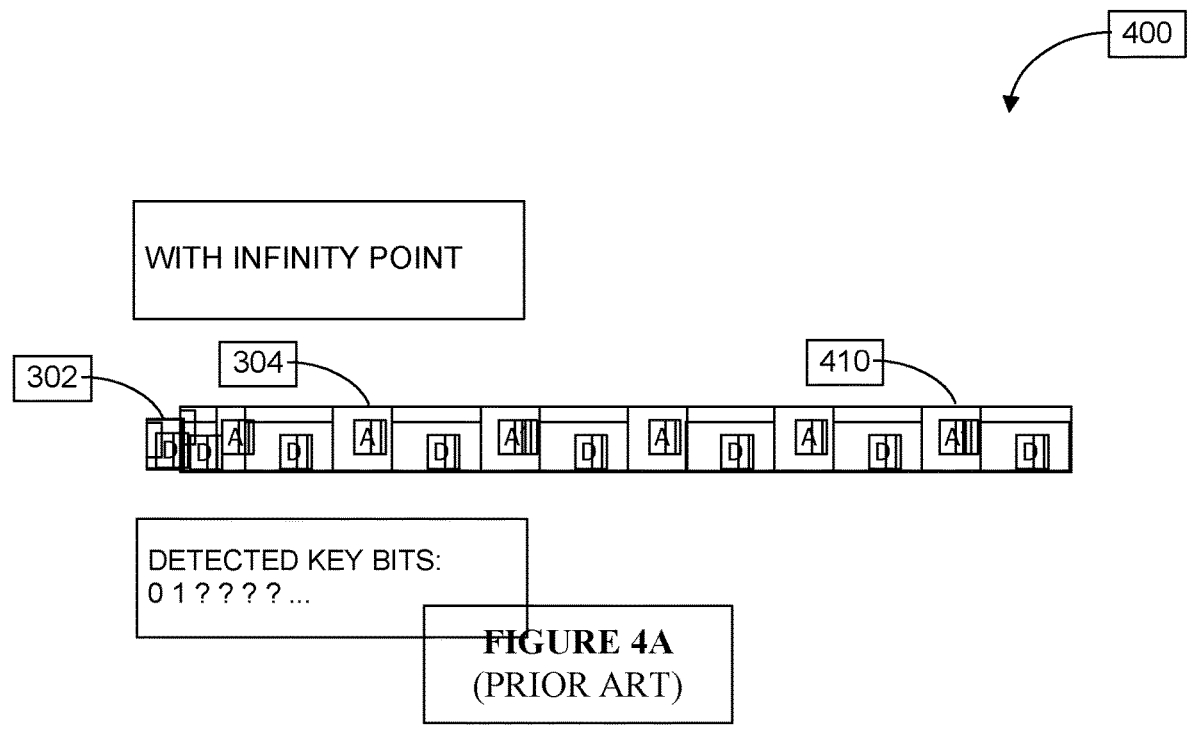
FIG. 4A illustrates an exemplary sequence of elliptic double-and-always-add operations as a countermeasure without initialization to the infinity point.
Figure 4B:
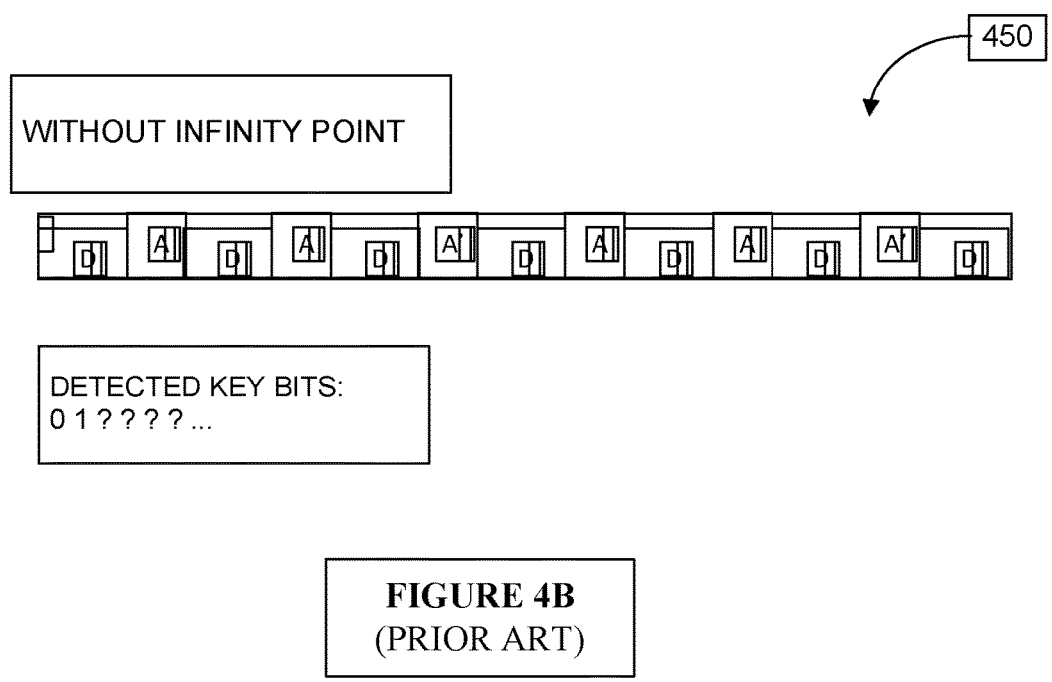
FIG. 4B illustrates an existing sequence of elliptic double-and-always-add operations as a countermeasure with initialization to the infinity point.

FIG. 4A illustrates an exemplary sequence of elliptic double-and-always-add operations as a countermeasure without initialization to the infinity point. In the double-and-always-add algorithm, dummy operations denoted as A' 410 are inserted into sequence 400 in order to obtain a constant operation flow. However, if a register is initialized to the infinity point, it is possible to detect this and, thus, determine the length of the secret key, for example, as number of MSBs set to zero. Unlike the sequence in FIG. 4A, the sequence of elliptic double and always add operations in FIG. 4B does not use an initialization to the infinity point. This may be accomplished by initializing a register to a base point, such that it behaves as if the MSB is set equal to 1 (i.e., a 1-bit leak). Therefore, the double-and-always-add operations in FIG. 4B serve as a countermeasure by preventing the detection of the infinity point.

Unfortunately, dummy operations A' 410 may still be detected, for example, through a c-safe-error attack, which involves inserting a fault into the system during the computation of A 304 or A' 410 and observing whether the result contains a fault. If, in response to the fault attack, the result remains unchanged, i.e., the fault did not alter the result, this indicates that the operation was a dummy operation. As a result, an attacker may identify and eliminate dummy operations in a sequence of elliptic double-and-always-add operations in order to recover bits of the secret key.

Overall, it would be desirable to have systems and methods that provide protection against timing analysis, Simple Power Analysis (SPA), EM analysis, and fault attacks for elliptic scalar operations that make to-be-protected secrets flow independent.

Figure 5A:
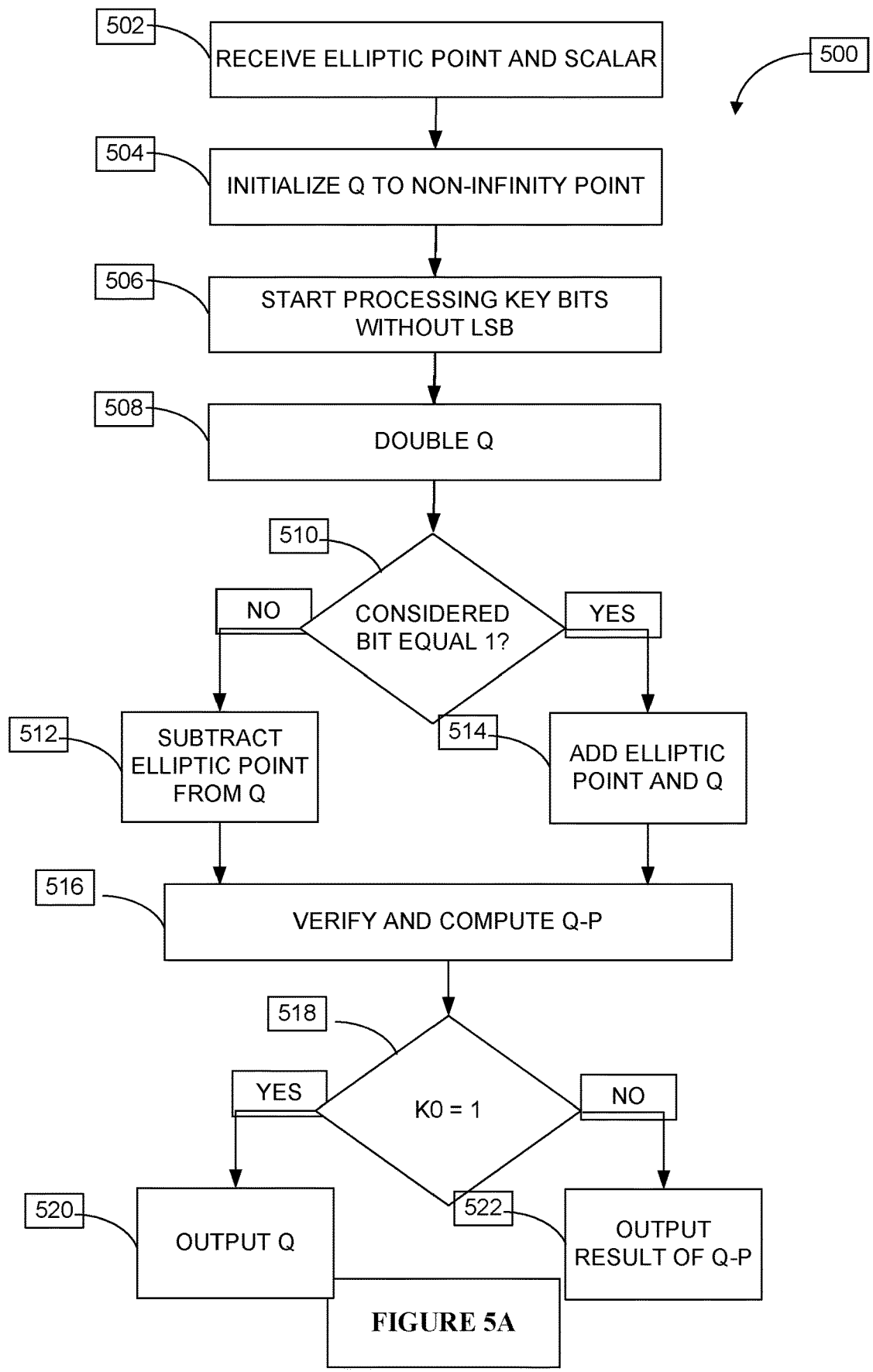
FIG. 5A is a flowchart that illustrates a process using a scalar double-and-add algorithm that is resistant to simple power analysis and c-safe-error, according to various embodiments of the invention.

FIG. 5A is a flowchart that illustrates a process using a scalar double-and-add algorithm that is resistant to simple power analysis and c-safe-error, according to various embodiments of the invention. Process 500 begins at step 502 when an elliptic point and a scalar are received by an ECC. At step 504, Q is initialized to the base point. Initialization at a non-neutral point avoids 2*0 and 0+P type operations being performed and, thus, serves as a countermeasure, for example, for the attack schemes mentioned with reference to FIG. 1 that exploit the detectability of zero bits based on timing pattern analysis and the like. In addition, the secret length remains protected from mathematical cryptoanalysis tools, such as lattice attacks, that seek to retrieve a secret from partial information (e.g., a few bits) that is less than the scalar value of the bit.

At step 506 key bits of the scalar are sequentially processed, for example, iteratively in a loop configuration exclusive of the secret LSB to prevent the loop from counting down to zero. The processing of the secret bits includes always doubling Q at step 508, and, if the parsed value of the processed bit is not equal to 1, then performing an elliptical point subtraction by subtracting the elliptic point from Q, at step 512 and, otherwise, at step 514, performing elliptical point addition by adding the elliptic point to Q. It is noted that this is accomplished without the need to inject dummy operations that are intended as a countermeasure to non-invasive channel analysis such as SPA attacks, since dummy operations remain detectable by, for example, fault injection attacks (c-safe error) that inject a fault in an operation to detect a dummy operation based on its characteristic of not altering the result in any manner.

In one embodiment, elliptical point subtraction and addition are performed in a balanced loop configuration. Advantageously, since the two operations of elliptical point addition and subtraction are nearly electrically indistinguishable from each other with respect to timing and power consumption, the circuit attacks based on detection of electrical signatures through power analysis or EM equivalent are made more difficult, thereby, increasing the resistance of the circuit against side-channel attacks.

At step 514, once the secret bits have been processed, a point verification operation checks for calculation errors, for example, by determining whether the result is indeed located on the curve as an indication that no fault occurred. Point verification is recommended for against fault attack. In addition, outside of the loop, the difference between Q and the elliptic point is computed not necessarily to obtain accurate results, but to protect the secret LSB from timing attacks, SPA, and EM equivalent.

Finally, once the secret key bits are processed, it is determined whether the LSB is 1, at step 518. If so, Q is output, at step 520; otherwise, the result of Q-P is output at step 522.

However, preventing the loop from counting down to zero by excluding the secret LSB when iteratively processing key bits of the scalar in a loop configuration, such that the scalar LSB, $k_0$, is evaluated outside the loop may create a risk that the LSB information may leak to the outside world depending on the specific implementation of the process in FIG. 5A. While the security risks associated with such a minor leak are, in general, relatively small, recent cryptoanalysis research has shown that a single bit of leakage was sufficient to break an ECDSA with 160 bits. While this does not necessarily imply that every key can be discovered using the same method, eventually, motivated attackers would be able to crack some even larger, e.g., 256 bit, keys.

Moreover, during the evaluation of the LSB, calculated values of both Q and (Q-P) are stored at two distinct memory locations, for example, each at a memory position at a given address within a specific register, which depends on the architecture of the chip holding the register. Therefore, in the event that either one of the two memory locations is compromised, an attacker having knowledge of the correctness of the value of the returned result may discover whether $k_0=0$ or $k_0=1$. Similarly, by examining a power consumption pattern, attackers may detect the presence of an if-else construct and conclude therefrom whether $k_0=0$ or $k_0=1$.

As sophisticated attackers may take advantage of a specific side-channel leakage to exploit a potential weakness in the process shown in FIG. 5A, it would be desirable to have systems and methods that enhance protection by eliminating potential detectability (e.g., via side-channel analysis) due to even a single bit of leaked information.

Figure 5C:
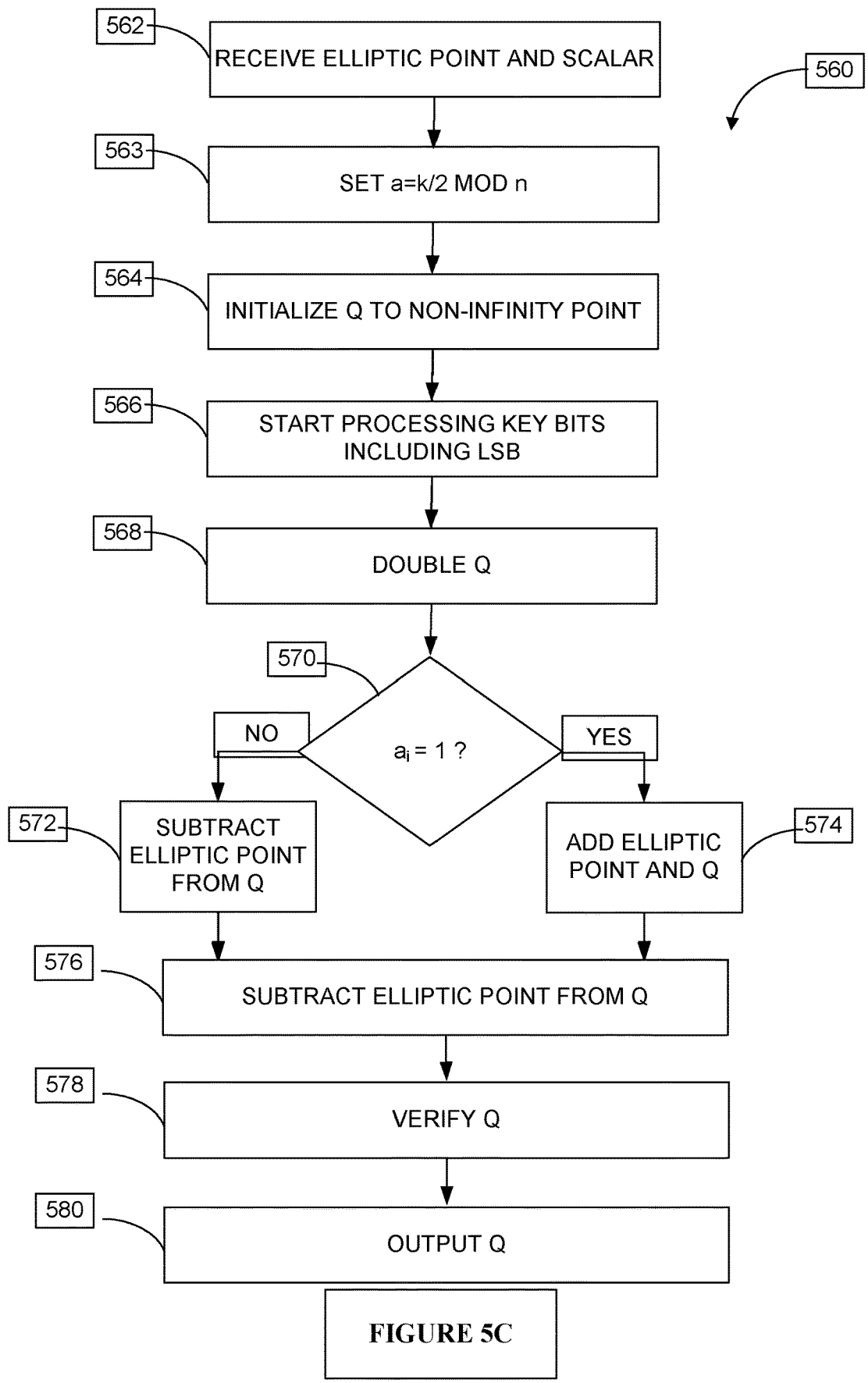

FIG. 5B and FIG. 5C illustrate exemplary flowcharts for processes that provide resistance to simple power analysis and c-safe-errors by evaluating the LSB within a loop, according to various embodiments of the invention. FIG. 5B uses k and P/2 as base point, whereas the example in FIG. 5C uses k/2 and P as base point. It is noted that this concept may be extended to using k and P as base point to obtain 2 kP as the result.

Process 530 in FIG. 5B for evaluating the LSB within a loop begins at step 532 when elliptic point P/2 and a scalar are input into an ECC. At step 534, Q is initialized to non-neutral point P/2, again, to avoid detectability of zero bits based on timing pattern analysis, etc., and to protected the secret length from mathematical cryptoanalysis tools.

At step 536 key bits of the scalar are sequentially iteratively processed, e.g., in a balanced loop configuration that includes the secret LSB, such that the loop counts down all the way from the MSB to the LSB. The processing of the secret bits comprises always doubling Q at step 538, and, if the parsed value of the processed bit is not equal to 1, at step 540, then performing an elliptical point subtraction by subtracting the elliptic point P/2 from Q, at step 542 and, otherwise, at step 544, performing elliptical point addition by adding P/2 to Q. As with FIG. 5A, this is accomplished without the need to inject potentially detectable dummy operations.

At step 546, once all secret bits have been processed, an elliptical point subtraction is performed by, again, subtracting the elliptic point P/2 from Q before, at step 548 Q is verified and, Q is output, at step 550.

FIG. 5C is a flowchart that illustrates a process using a scalar double-and-add algorithm that is resistant to simple power analysis and c-safe-error, according to various embodiments of the invention. This process may be more suitable when P is provided from outside and one wished to avoid performing a time-consuming computation of P/2.

Process 560 in FIG. 5C for evaluating the LSB within a loop begins at step 562 when an elliptic point and a scalar are received by an ECC.

At step 563, a is set to k/2 mod n.

At step 564, Q is initialized to the base point.

At step 566, key bits of the scalar are sequentially iteratively processed, e.g., in a balanced loop configuration that includes the secret LSB, such that the loop counts down all the way to the value zero. The processing of the secret bits comprises always doubling Q at step 568. If, at step 570, $a_i$ is not equal to 1, then, at step 572, an elliptical point subtraction is performed to subtract the elliptic point from Q; otherwise, at step 574, P is added to Q to perform an elliptical point addition without relying on dummy operations.

At step 576, once all secret bits have been processed, another elliptical point subtraction is performed by to, again, subtract the elliptic point P/2 from Q.

At step 546 Q is verified before, finally, Q is output, at step 550.

One critical constraint of cryptographic algorithms is the tradeoff between implementation cost and performance. Some existing cryptographic systems use memory to store intermediate results to improve performance in terms of scalar operations. Pre-processing improves performance over double-and-add as memory can be used to store and reuse points for calculations and operations. It will be appreciated by those skilled in the art that fewer or additional steps may be incorporated with the steps illustrated herein without departing from the scope of the invention. No particular order is implied by the arrangement of blocks within the flowchart or the description herein. It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

Figure 6:
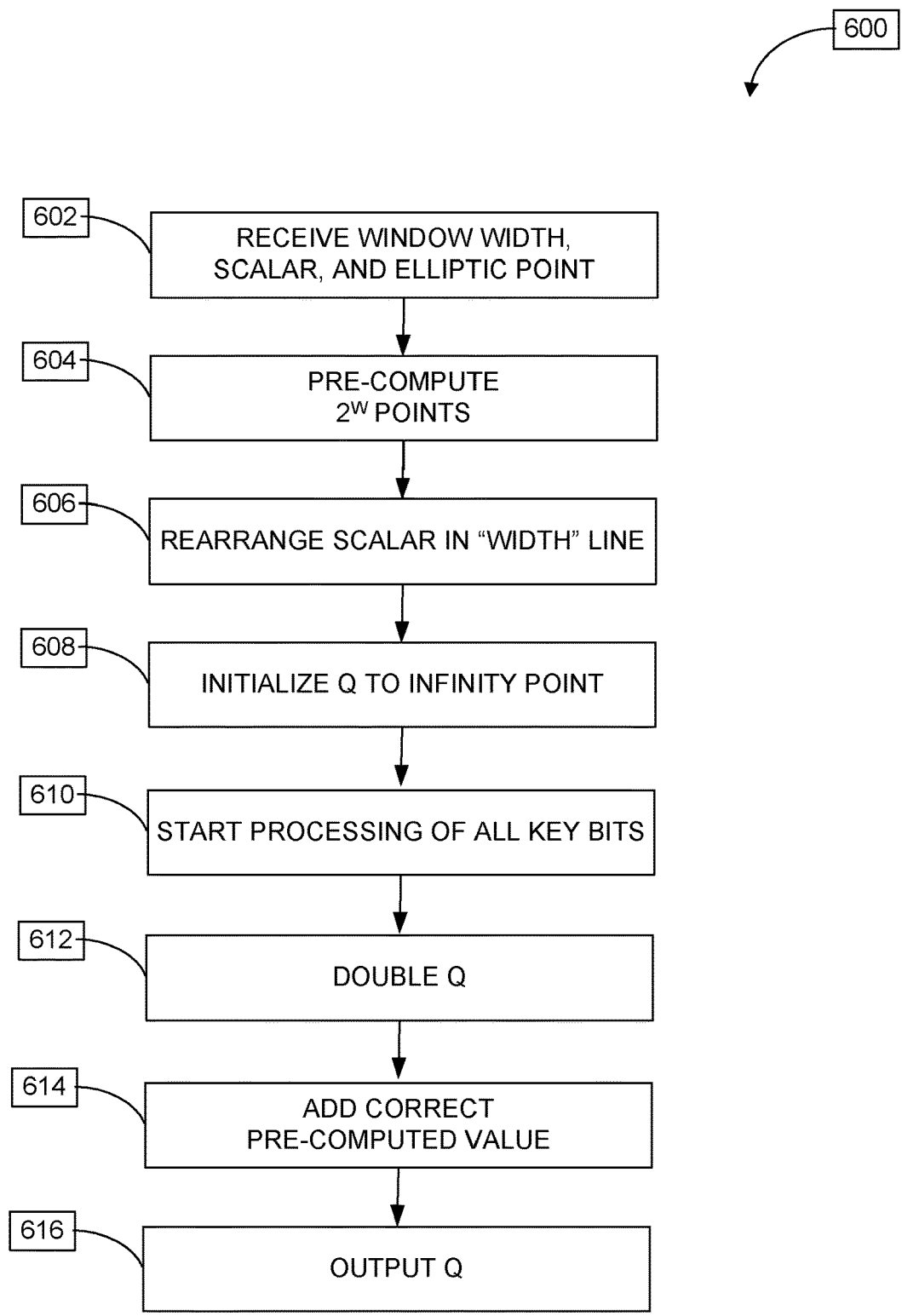
FIG. 6 is a flowchart that illustrates a prior art process using an existing fixed-base comb algorithm that includes pre-computation.

FIG. 6 is a flowchart that illustrates a prior art process using an existing fixed-base comb algorithm that includes pre-computation.

Process 600 begins at step 602 when a scalar, an elliptic point, and a window width are received by the ECC for processing.

At step 604, $2^w$ points are pre-computed, and the scalar width line is rearranged at step 606.

At step 608, Q is initialized to the infinity point before, at step 610, key bits of the scalar are sequentially processed.

Processing of the secret bits includes doubling Q, at step 612.

At step 614, the correct pre-computed values are added by performing elliptical point addition before, finally, at step 616, the elliptic point is output.

However, process 600 suffers from similar deficiencies in terms of security as the process in FIG. 1, including the initialization of Q at the infinity point, which leaks information about the fact that no operation is performed when the value of the secret bit equals zero and, thus, enables attackers to power trace characteristic patterns, etc.

Figure 7:
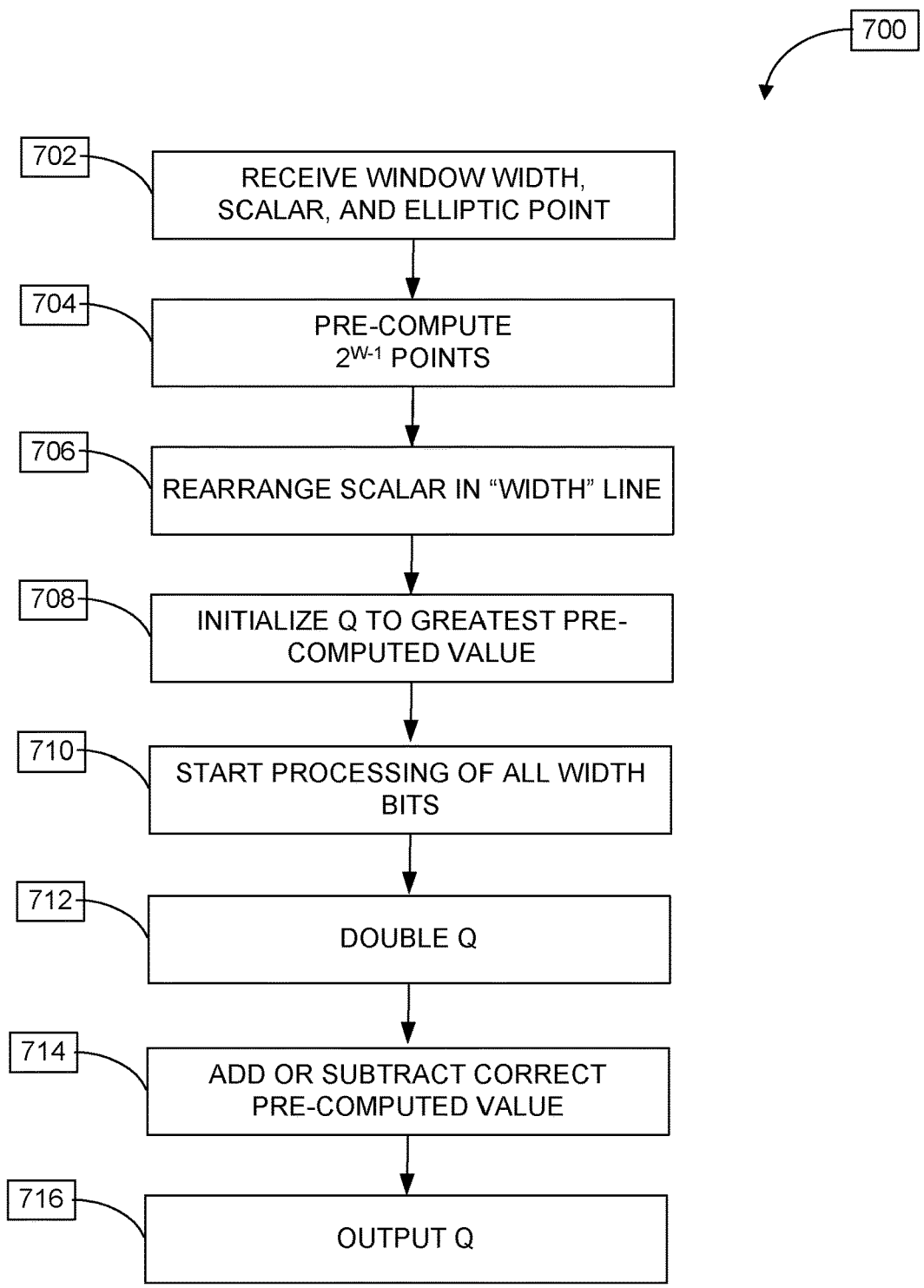
FIG. 7 is a flowchart that illustrates a process using an exemplary fixed-base comb algorithm, according to various embodiments of the invention.

Various embodiments of the innovation take advantage of reusing pre-calculated values in different scenarios so as to reduce the number of required pre-calculated values. This allows for a reduction in implementation cost compared to existing methods. Applied to scalar algorithms that use pre-calculated values, some embodiments of the innovation provide for a reduction in about half of the number of pre-calculated values without causing any noticeable reduction in performance. FIG. 7 is a flowchart that illustrates a process using an exemplary fixed-base comb algorithm, according to various embodiments of the invention. Process 700 implements some of the same novel schemes to a scalar fixed-base comb method and any derivatives so as to make the hardware side-channel attack resistant.

Process 700 begins at step 702 when a scalar, an elliptic point, and a window width are received by the ECC for processing.

At step 704, $2^{w-1}$ points are pre-computed and saved.

At step 706, the scalar width line is rearranged.

At step 708, Q is initialized to the greatest pre-computed value.

At step 710, width bits of the scalar are sequentially processed, for example, four lines of 64 bits iteratively in a loop configuration inclusive or exclusive of the secret LSB.

Processing of the secret bits includes doubling Q, at step 712.

At step 714, the correct pre-computed values are added or subtracted by performing elliptical point addition or subtraction, for example, in a balanced loop configuration so as to use each pre-computed value twice. In one embodiment, this reduces the number of pre-calculated values in half as each value is used twice. In cases where pre-calculated values need to be stored, this reduces memory requirements and, therefore, leads to an increased performance-to-cost ratio.

Finally, at step 716, the elliptic point is output.

It is understood that the pre-calculated MSB of the scalar need not be forced at '1' during pre-calculations. Process 700 may be performed equally well with MSB set to '0,' as it is not necessary to counteract the infinity point problem of existing processes that try to hide the secret launch of a basic operation from detection. Since in process 700 the launch remains hidden, no information leakage takes place, thereby, strengthening the side-channel attack resistance of the system. Further, while not explicitly shown, one skilled in the art will appreciate that bits may be padded with additional bits in order to equalize string lengths as necessary. One of ordinary skill in the art will appreciate that in pre-computation cases multi-bits of the scalar may be parsed simultaneously instead of one by one.

Figure 8:
FIG. 8 illustrates a sequence of scalar double-and-add operations generated by one of the processes in FIGS. 5A-5C and 7.

FIG. 8 illustrates a sequence of scalar double-and-add operations generated by one of the processes in FIGS. 5A-5C and 7.

Figure 9:
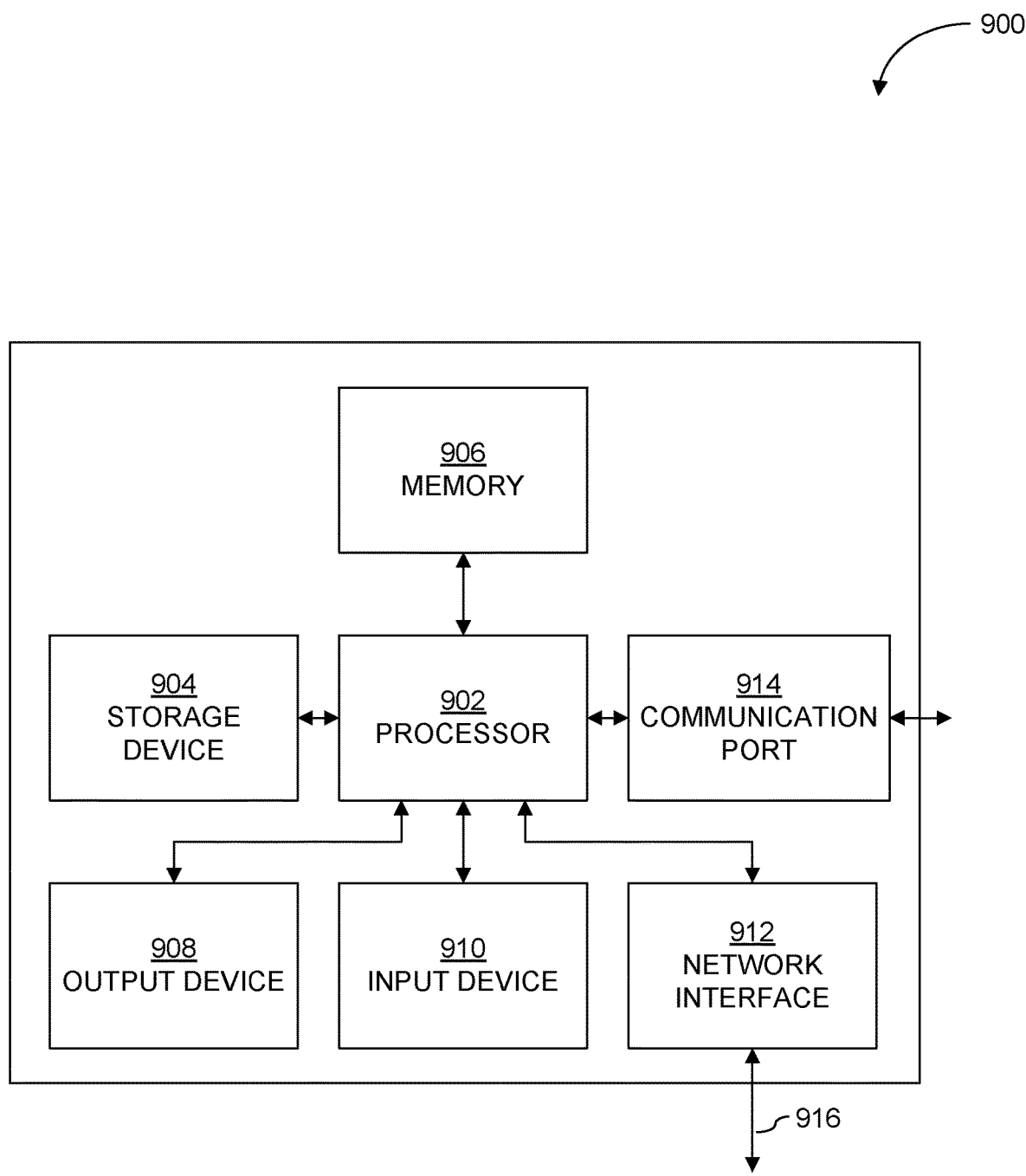
FIG. 9 illustrates a functional block diagram of a secure computing system that implements embodiments of the present invention.

FIG. 9 illustrates a functional block diagram of a secure computing system that implements embodiments of the present invention. Aspects of the present patent document are directed to secure systems for ECCs. System 900 may comprise a plurality of input devices 910, output devices 908, processor 902, communication port 914, memory 906, and network interface 912, a power supply (not shown), and other components that are not shown for sake of simplicity. Processor 902 may comprise a secure cryptographic microcontroller; local and system level buses; function modules, including a CPU core, a universal memory controller, key sources, a cryptographic processor; a symmetric key crypto accelerator (e.g. an AES); and an asymmetric key crypto accelerator (e.g., for RSA and ECCs). Control units may be included in the CPU core and/or the universal memory controller of processor 902 to copy or temporarily store a secret key, for example, in memory 906. A dedicated secure link may be applied to allow processor 902 to communicate with key sources to transfer key request commands and secret keys via the secure link rather than a bus.

For purposes of this disclosure, secure system 900 may further include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a secure system may be embedded into a computer, mobile device (e.g., personal digital assistant or smart phone), server (e.g., blade server or rack server), network storage device, or any other suitable device and may vary in size, shape, performance, and functionality. Secure system 900 may include random access memory, one or more processing resources, (e.g., CPU) or hardware or software control logic, ROM, and/or other types of nonvolatile memory. Additional components of secure system 900 may include one or more buses operable to transmit communications between the various hardware components.

It will be understood that the functionalities shown for system 900 may operate to support various embodiments of a secure system—although it is understood that secure system 900 may be differently configured and include other components that implement the embodiments computing elliptical curve operations (e.g., using a curve of an n-bit length) for use in digital signatures and other protocols to performing the computations in a security context (e.g., Elliptic Curve Digital Signature Algorithm, Elliptic Curve Diffie-Hellman Exchange, Elliptic Curve Integrated Encryption Scheme).

It is noted that aspects of the present invention may be encoded on one or more non-transitory computer-readable media with instructions for one or more processors 902 to cause steps to be performed. The non-transitory computer-readable media may include volatile and non-volatile memory 906. It is also noted that alternative implementations are possible, including hardware and software/hardware implementations. Hardware-implemented functions may be realized using ASICs, programmable arrays, digital signal processing circuitry (e.g., state machines configured to directly implement an elliptic scalar operations), and the like. Accordingly, the "means" terms in any claims are intended to cover both software and hardware implementations. Similarly, the term "computer-readable medium or media" as used herein includes software and/or hardware having a program of instructions embodied therein or a combination thereof.

With these implementation alternatives in mind, it is understood that the figures and accompanying description provide the functional information that a person skilled in the art would require to write program code (i.e., software) and/or to fabricate circuits (i.e., hardware) to perform the processing required. One skilled in the art will recognize that no particular security system, protocol, or programming language is critical to the practice of the present invention. One skilled in the art will also recognize that a number of the elements described above may be physically and/or functionally separated into sub-modules or combined together.

It will be appreciated by those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A secure Elliptic Curve Cryptosystem (ECC) for performing elliptic scalar operations, the ECC comprising:
   a secure microcontroller that is embedded in a computing system, the secure microcontroller comprising a cryptography circuit configured to implement a countermeasure and prevent secret scalar leakage; and
   a memory to store a secret scalar, k, that comprises secret key bits, the cryptography circuit performing elliptic scalar operations comprising instructions for:
      receiving an elliptic point, P/2, and the secret scalar, k;
      initializing a value Q to the elliptic point that does not include an initial value at an infinity point;

processing the secret key bits of the secret scalar in sequential steps, wherein processing comprises doubling the value Q, wherein each step comprises performing elliptic operations comprising at least one of elliptical point subtraction or addition;

performing an elliptical point subtraction by subtracting the elliptic point, P/2, from the value Q to compute a product kP; and determining a difference between the value Q and the elliptic point outside of a balanced loop configuration to protect a least significant bit from a power analysis attack.

2. The secure ECC according to claim 1, further comprising a state machine that performs one or more of the elliptic scalar operations.

3. The secure ECC according to claim 1, further comprising a register initialized to a point other than a point at infinity.

4. The secure ECC according to claim 1, further comprising a secret most significant bit that is set to zero.

5. The secure ECC according to claim 1, wherein the cryptography circuit is configured to perform a point verification operation to protect against fault attacks.

6. The secure ECC according to claim 1, further comprising memory to store intermediate results of the elliptic scalar operations.

7. A secure Elliptic Curve Cryptosystem (ECC) for performing elliptic scalar operations, the ECC comprising:

a secure microcontroller that is embedded in a computing system that comprises a cryptography circuit configured to implement a countermeasure and prevent secret scalar leakage; and a memory to store a secret scalar, k, that comprises secret key bits, the cryptography circuit performing elliptic scalar operations comprising instructions for:

receiving an elliptic point, P/2, and the secret scalar, k;

initializing a value Q to the elliptic point that does not include an initial value at an infinity point;

processing the secret key bits of the secret scalar in sequential steps, wherein processing comprises doubling the value Q, wherein each sequential step comprises performing elliptic operations comprising at least one of elliptical point subtraction and addition;

performing an elliptical point subtraction by subtracting the elliptic point, P/2, from the value Q to compute a product kP; and determining a difference between the value Q and the elliptic point outside of a balanced loop configuration to protect a least significant bit from a safe error attack.

8. The secure ECC according to claim 7, further comprising a state machine that performs one or more of the elliptic scalar operations.

9. The secure ECC according to claim 7, further comprising a register that is initialized to a point other than a point at infinity.

10. The secure ECC according to claim 7, further comprising a secret most significant bit that is set to zero.

11. The secure ECC according to claim 7, wherein the cryptography circuit is configured to perform a point verification operation to protect against fault attacks.

12. The secure ECC according to claim 7, further comprising memory to store intermediate results of the elliptic scalar operations.

13. A method to create a secret-independent operation flow, the method comprising:

in an Elliptic Curve Cryptosystem (ECC) that is embedded in a computing system receiving an elliptic point, P/2, and a secret scalar, k, that comprises secret key bit;

initializing a value Q to the elliptic point that does not include an initial value at an infinity point;

processing the secret key bits of the scalar in sequential steps, wherein processing comprises doubling the value Q, wherein each sequential step comprises performing elliptic operations comprising at least one of elliptical point subtraction or addition;

performing an elliptical point subtraction by subtracting the elliptic point, P/2, from the value Q to compute a product kP; and determining a difference between the value Q and the elliptic point outside of a balanced loop configuration to protect a least significant bit from at least one of a power analysis attack or a safe error attack.

14. The method according to claim 13, wherein the secret scalar comprises a predetermined window width.

15. The method according to claim 13, wherein the elliptical point subtraction or addition uses pre-calculated values to reduce the number of values to be calculated.

16. The method according to claim 13, further comprising initializing the value Q to the greatest pre-computed value.

17. The method according to claim 13, further comprising sequentially processing width bits of the secret scalar.

18. The method according to claim 13, further comprising generating a sequence that includes no dummy operations and no operations that involve an initial value of infinity.

19. The method according to claim 13, further comprising applying the method to a scalar fixed-based comb method such that re-using pre-calculated values in the balanced loop configuration reduces a number of pre-calculated values.

20. The method according to claim 13, further comprising performing a point verification operation that comprises detecting calculation errors by determining whether a result is located on an elliptic curve.

* * * * *